(12) United States Patent
Middleton, Jr.

(10) Patent No.: US 9,494,194 B1
(45) Date of Patent: Nov. 15, 2016

(54) PROCESS FOR MAKING AN INTERLOCKING FLANGED BUSHING AND PRODUCTS MADE BY THIS PROCESS

(71) Applicant: Robert L. Middleton, Jr., Middleville, MI (US)

(72) Inventor: Robert L. Middleton, Jr., Middleville, MI (US)

(73) Assignee: Middleville Tool & Die Company, Middleville, MI (US)

( * ) Notice: Subject to any disclaimer, the term of this patent is extended or adjusted under 35 U.S.C. 154(b) by 81 days.

(21) Appl. No.: 14/714,393

(22) Filed: May 18, 2015

Related U.S. Application Data (62) Division of application No. 13/599,223, filed on Aug. 30, 2012, now Pat. No. 9,050,639.

(51) Int. Cl.
*B21D 53/10* (2006.01)
*F16C 33/14* (2006.01)
*B21D 39/02* (2006.01)

(52) U.S. Cl.
CPC .............. *F16C 33/14* (2013.01); *B21D 39/02* (2013.01); *B21D 53/10* (2013.01)

(58) Field of Classification Search
CPC ......... F16L 59/022; F16L 9/17; F16L 9/165; F16L 9/02; B21C 37/0818; B21C 37/083; B21C 37/08; B21C 37/0826; B21D 39/037; B21D 53/10; B21D 53/16; B21D 51/26; B21D 51/263; B21D 51/20; B21D 51/2676; B21D 35/00; B21D 51/10; B21D 41/02; B21D 41/025; B21D 19/046; B21D 19/00; B65D 63/04; B21B 23/00; F16C 33/14; F16C 43/02; F16C 2226/78

See application file for complete search history.

(56) References Cited

U.S. PATENT DOCUMENTS

| | | | | |
|---|---|---|---|---|
| 819,866 | A | * | 5/1906 | Dobson ................... F16B 12/46 16/109 |
| 4,693,107 | A | * | 9/1987 | Kohama ................ B21D 22/08 72/355.4 |

FOREIGN PATENT DOCUMENTS

DE      2406361 A1 * 8/1975 ............. B21D 51/10

* cited by examiner

*Primary Examiner* — David Bryant
*Assistant Examiner* — Jun Yoo
(74) *Attorney, Agent, or Firm* — Barry C. Kane; Kane & Co., PLC (57) ABSTRACT

The provided process creates a fully flanged interlocked bushing by feeding a metal strip into a stamping assembly having a plurality of tool stations. The stations blank a workpiece from the metal strip, and trim the workpiece's two opposing ends forming a triangular shaped tab and a puzzle locking feature on either end. The workpiece is then formed into an annular shape, wherein the triangular shaped tabs are overlapped as the opposing ends are abutted and interlocked. A flange is then imparted into the side wall of the workpiece relieving the tab's overlapping condition, causing the tabs to abut one another and become co-planar with the flange. This creating a fully flanged part with a tightly fitted parting line. This invention also includes products formed by the aforementioned process.

3 Claims, 10 Drawing Sheets

PROCESS FOR MAKING AN INTERLOCKING FLANGED BUSHING AND PRODUCTS MADE BY THIS PROCESS

CROSS REFERENCE TO RELATED APPLICATIONS

This application, filed under 37 C.F.R. 1.53(b), is a divisional of earlier filed and still pending U.S. non-provisional patent application entitled, "PROCESS FOR MAKING AN INTERLOCKING GLANGED BUSHING AND PRODUCTS MADE BY THIS PROCESS," assigned Ser. No. 13/599,223, and filed on Aug. 30, 2012, the contents of which are incorporated herein by reference.

BACKGROUND OF THE INVENTION

Field of the Invention

This invention relates to a method for making a tubular bushing from flat stock, and particularly to a method for making a fully flanged bushing with interlocking features.

Description of the Related Art

Bushings, including flanged bushings, may be formed by processes such as roll forming, draw forming, spinning, or stamping, however, a major disadvantage experienced with many of these processes is the extensive material stretching which the workpiece must undergo in order to achieve its final form. Some processes, such as draw forming in particular, deform the workpiece so extensively that they grossly alter or deform the material's grain structure creating a part with internally dissimilar material properties due to work (strain) hardening.

Another disadvantage of these processes occurs when a closed annular form is flanged in a radial direction. Since the area of a circular flanged region is related to its radius through the formula: Area=Pi*Radius$^2$, the flange material must necessarily stretch to cover an ever increasing area as the flange's radial distance increases. This causes excessive stretching in flanged region which may be exhibited by thinning, wrinkling, or even rupture of the material in the flanged portion of the annular form.

Figure 1:
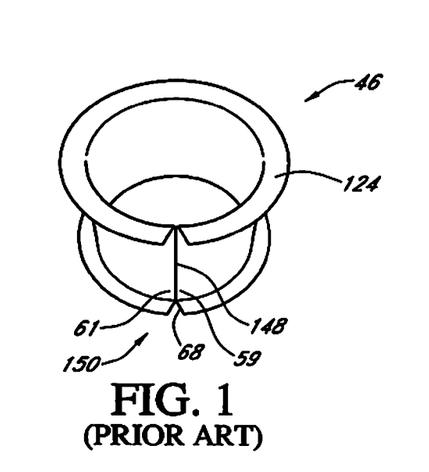
FIG. 1 is a perspective view of a prior art flanged bushing containing a 'V' shaped discontinuity along its parting line.

To avoid this issue, a portion of the annular form may be severed prior to formation of the flange. This creates a discontinuity in the flanged material that progressively enlarges with the increase in the flange's radius. This discontinuity appears as a 'V' shaped gap shown in FIG. 1 (Prior Art) which serves to relieve the excessive stretching by reducing the area of material coverage in the flange. However, the use of a discontinuous form in this manner has in inherent drawback, since the discontinuity lacks adjacent material support, it will tend to concentrate stresses and loads directly into the root of the discontinuity. This in turn may cause the separation or decoupling of the bushing, and release of any part contained therein.

The invention described herein provides a solution to the problems described above.

SUMMARY OF THE INVENTION

The present invention provides a method and apparatus for transforming a metal sheet into a fully flanged bushing with adjacent support by providing a metal strip into a stamping assembly. The metal strip is trimmed and punched to create a workpiece with a first trimmed end and a tab. The workpiece is formed into an annular shape by abutting a portion of the first trimmed edge with the workpiece's second opposing end, overlapping the tab with the annular form. The annular form is then flanged creating a radial flange, and the tab is positioned to lie co-planar with the flange.

The present invention also includes a method for transforming a metal sheet into a fully flanged bushing by providing a metal strip having a first and second exterior edge into a stamping assembly containing a plurality of tool stations. The tool stations trim the metal strip's first exterior edge creating a first end, a first tab, and a male interlocking feature. The second exterior edge of the metal strip is also trimmed creating a second opposing end, a second tab, and a female interlocking feature. A workpiece is then blanked from the metal strip and deformed to create an initially formed workpiece containing a first curvature in the workpiece's first end and a second curvature in the workpiece's second end. The workpiece is further formed into an annular interlocked workpiece by abutting the first and second ends of the workpiece causing the male interlocking feature to engage the female interlocking feature and causing the first tab to overlap the second tab. The workpiece is then flanged and the first and second tabs are positioned to lie adjacent and co-planar to one another on the flange.

The present invention further includes a method for transforming a metal sheet into a fully flanged bushing by providing a metal strip having a uniform thickness, first, and second exterior edges into a stamping assembly having a plurality of tool stations. Material is trimmed from the first exterior edge of the metal strip creating a first end with a first triangular shaped tab and a male puzzle locking member. Material is also trimmed from a second exterior edge of said metal strip creating a second opposing end with a second triangular shaped tab and a female puzzle locking recess. The metal strip is cut creating a workpiece with a slight radial cutout along the sides of the first and second triangular shaped tabs. The workpiece is further formed into an initially formed workpiece by imparting a first curvature into the first end of the workpiece, and imparting a slightly differing curvature to the second end of the workpiece. The workpiece is also deformed over a mandrel forming the workpiece into substantially U shaped form which is then formed into an annular interlocked workpiece by abutting the first and second ends of the workpiece, interlocking the male puzzle locking member with the female puzzle locking recess, and overlapping the first and second triangular shaped tabs. The workpiece is flanged creating a radial flange, wherein the first tab and second tabs are positioned to lie adjacent and co-planar to one another on the flange. The flanged part is then re-struck, expanding the male puzzle locking member and causing the first and second triangular tabs to abut one another on the radial flange.

It is also anticipated the invention may be performed in a stamping assembly which is purely a progressive die, purely a transfer die, or preferably a combination hybrid progressive/transfer die wherein the progressive portion is removable and interchangeable to allow for the sizing of different annular diameters. The present invention also covers and includes the products created by the processes described above.

These and other advantages will become readily apparent to the reader from the detailed description of the different forms of the invention, particularly when considered in combination with the drawing figures accompanying this application wherein:

DETAILED DESCRIPTION OF THE INVENTION

Figure 2:
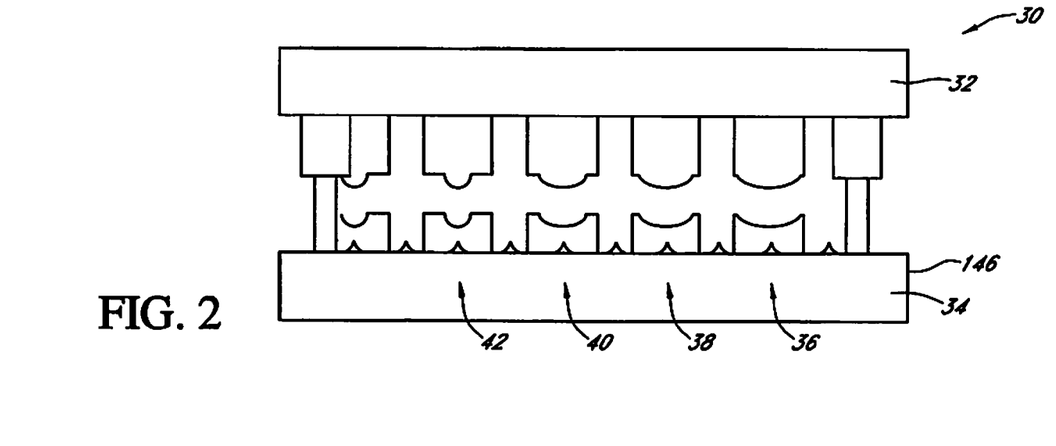
FIG. 2 is an elevation view of a simplified die assembly.

For the express purpose of the following description, the terms "upper," "lower," "right," "left," "rear," "front," "vertical," "horizontal," and derivatives thereof shall relate to the invention as oriented in FIG. 2. It should be understood the invention may assume different orientations and/or alternative steps or sequences unless it is expressly specified to the contrary. It should also be understood that the specific structures, devices, and processes illustrated in the accompanying drawing figures and described in the following specification are simply exemplary embodiments of the concepts and which are limited or restricted as defined in the appended claims.

The following description refers to tooling and apparatus used with the inventive process in their simplest terms. Those having at least some minimal understanding of the stamping and the tool and die industry will readily understand the implementation of the inventive steps and how they may be utilized with the inventive process. For example, we will not describe in detail the intricacies of general stamping principles such as placement and orientation of the individual die stations, gapping, offsets, and load balancing within the die tool, as these are well known to those skilled in the art of metal stamping.

FIG. 2 illustrates a simplified example of a die assembly 30 that may be used to perform the inventive process, comprising an upper die 32 and a lower die 34. The upper die is shown in greater detail in FIG. 3, and the lower die is shown in greater detail in FIG. 4.

Figure 5:
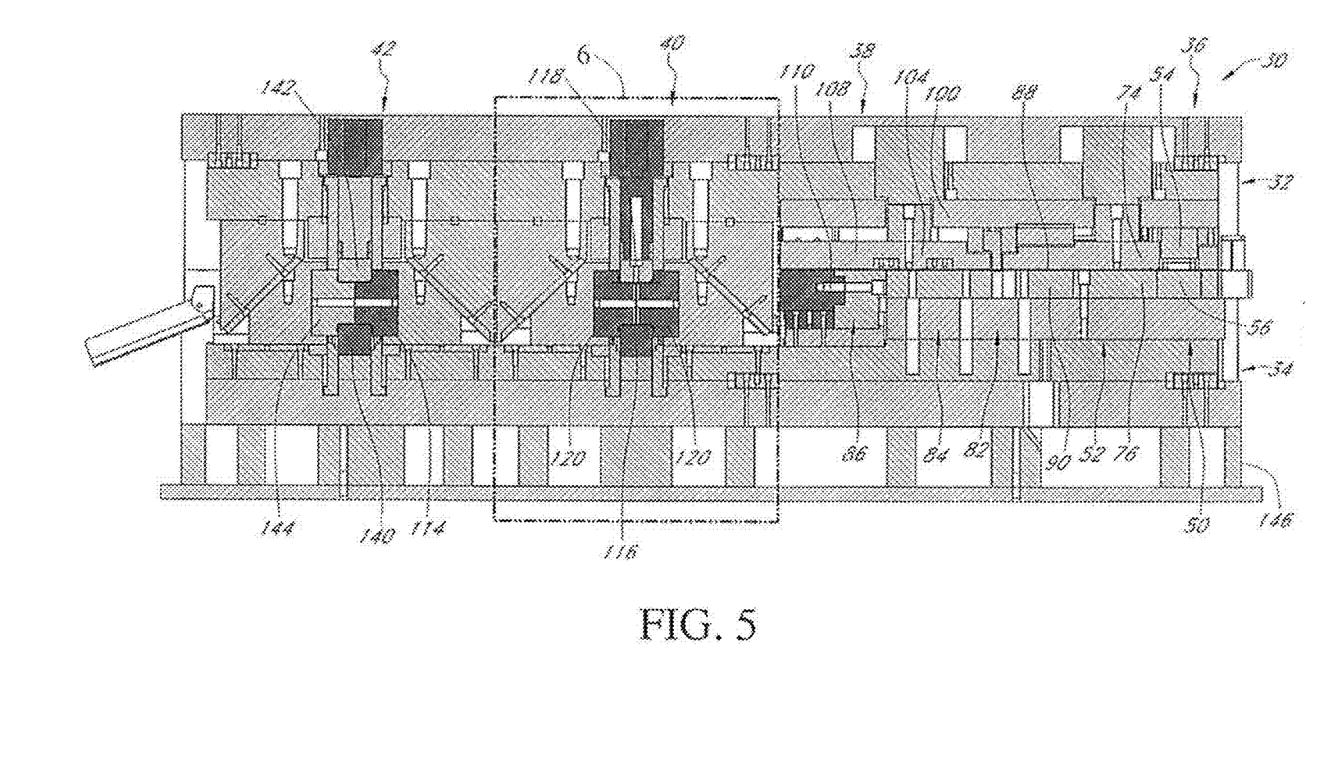
FIG. 5 is a cross sectional view of the upper and lower portions of the die assembly shown in FIGS. 3 and 4 taken along its midline.
Figure 6:
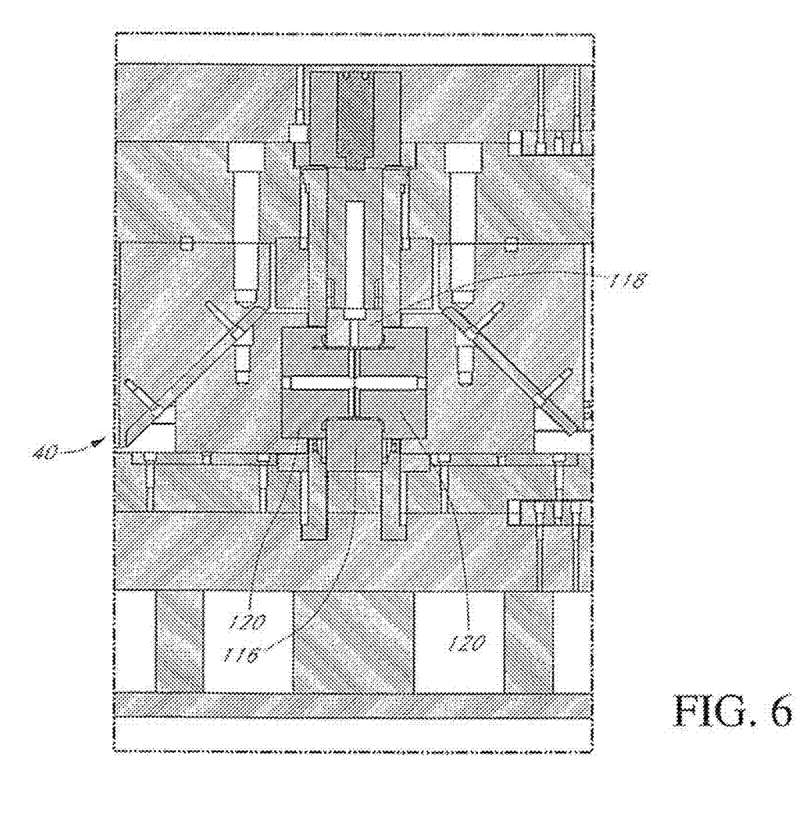
FIG. 6 is a detail view of area 6 as shown in FIG. 5.

The die assembly 30 comprises one or more of the following stations, each of which will be discussed in further detail below: trim station 36; annular forming station 38; flange forming station 40; and an optional finish station 42 which repacks and ejects the workpiece. Each station is further comprised of a complimentary tool half in the upper 32 and lower dies 34 which progressively forms the metal strip into a flanged bushing. FIG. 5 of the exemplary tool, further details the die assembly 30 via a cross section cut along the midline of the tool shown in FIGS. 3 and 4. FIG. 6 shows a detail view of the flange forming station 40 as shown at 6 in FIG. 5.

Figure 7:
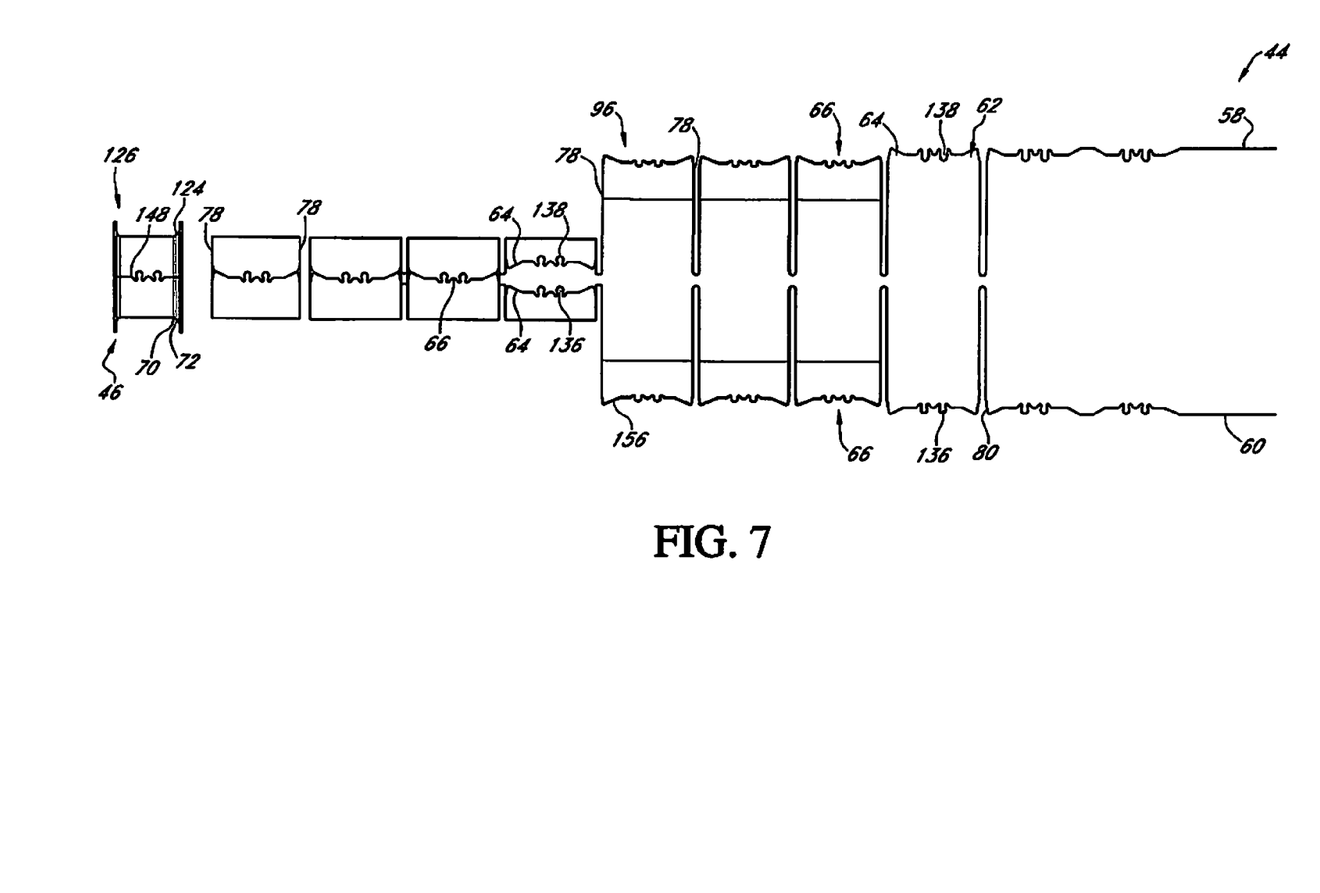
FIG. 7 is a plan view of a metal strip showing the progression of forming operations according to one form of the invention.
Figure 10:
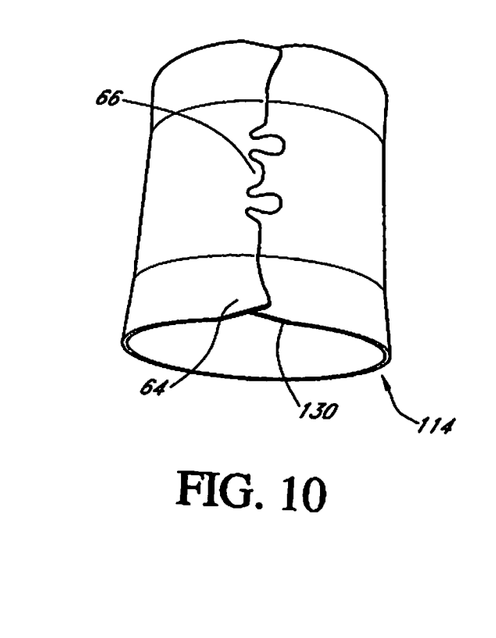
FIGS. 10 and 11 are perspective views of an exemplary workpiece formed by the interlocking and annular formation station.
Figure 11:
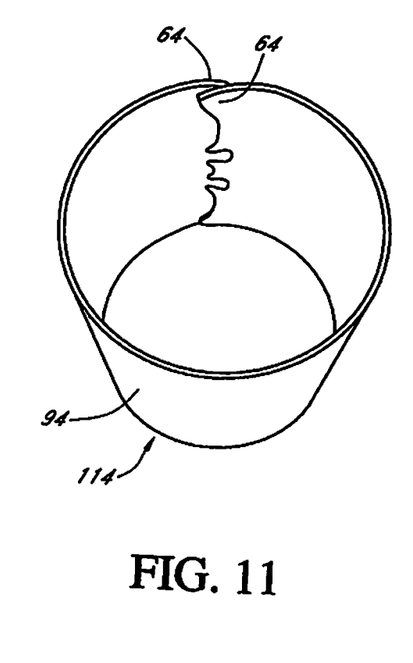
Figure 12:
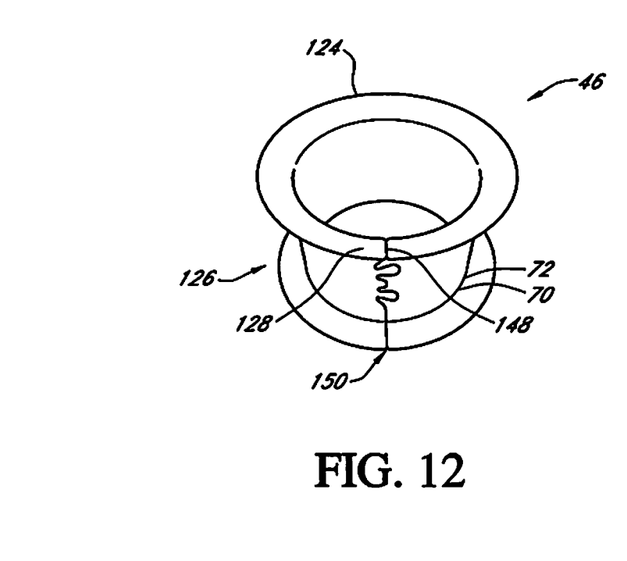
FIG. 12 is a perspective view of an exemplary workpiece formed by the inventive process.
Figure 13:
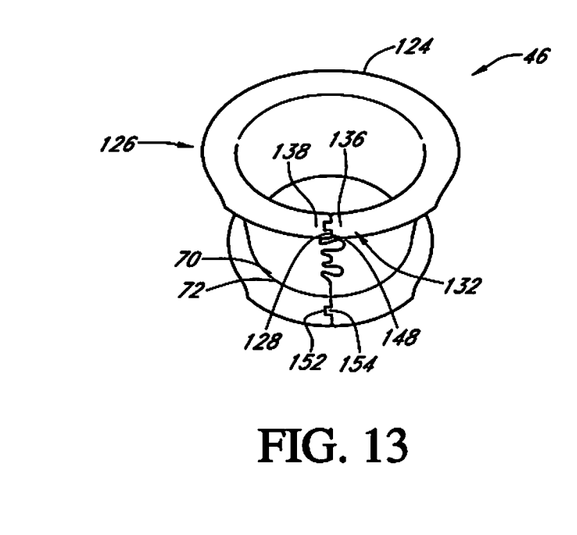
FIG. 13 is a perspective view of a second exemplary workpiece formed by the inventive process including a locking feature on the flange's parting line.

The product of the exemplary process is shown in FIG. 7 as a series of steps performed on a metal strip 44, progressively forming the strip into a flanged bushing 46. Perspective views of the workpiece during the intermediate forming steps are shown in FIGS. 8-11 and the flanged bushing itself 46 is shown in FIGS. 12 and 13, wherein FIG. 13 further details a flanged bushing 46 containing an optional flange locking feature 48.

Figure 3:
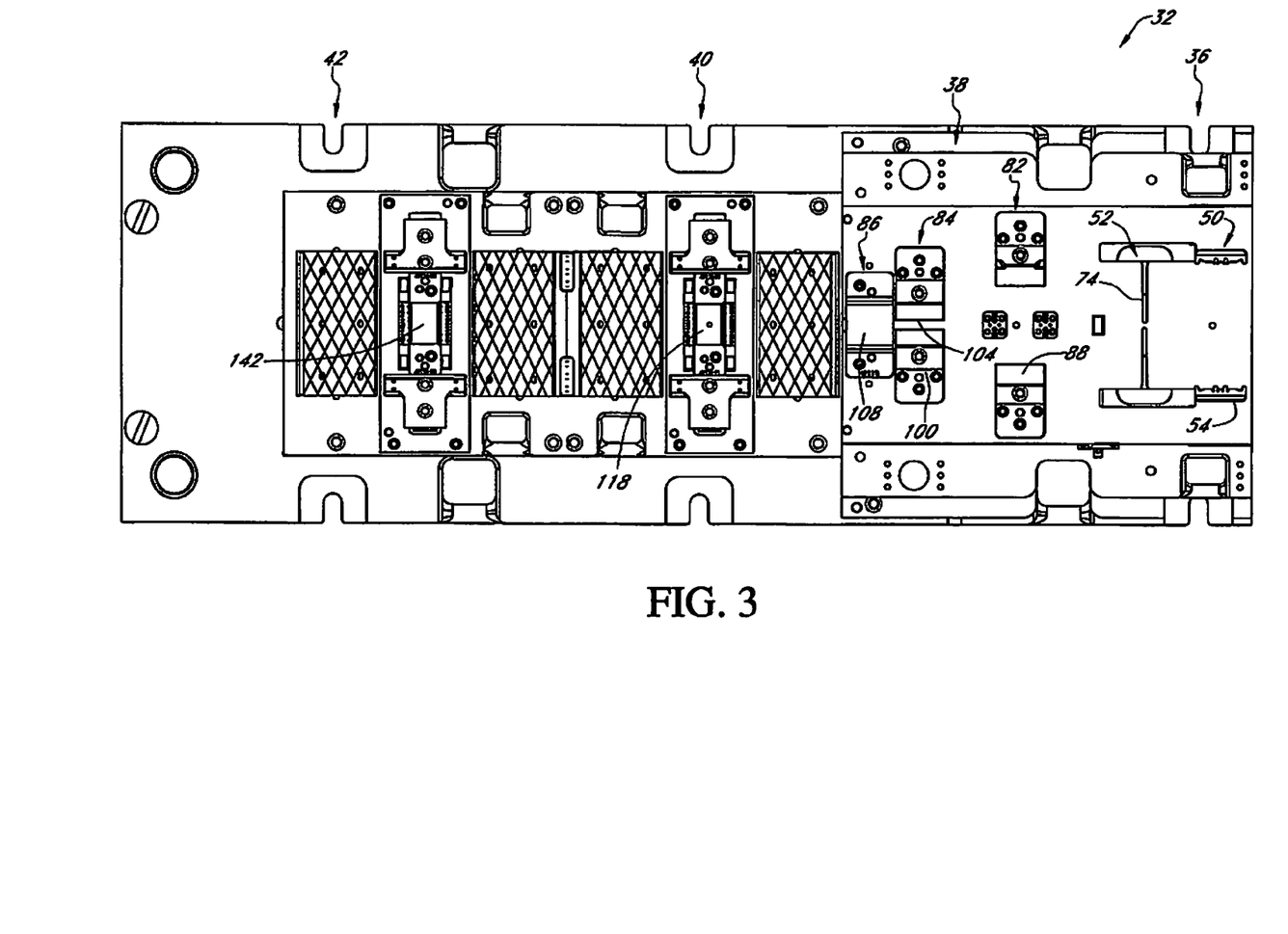
FIG. 3 is a bottom view of a upper portion of a die assembly for use with the inventive process.
Figure 4:
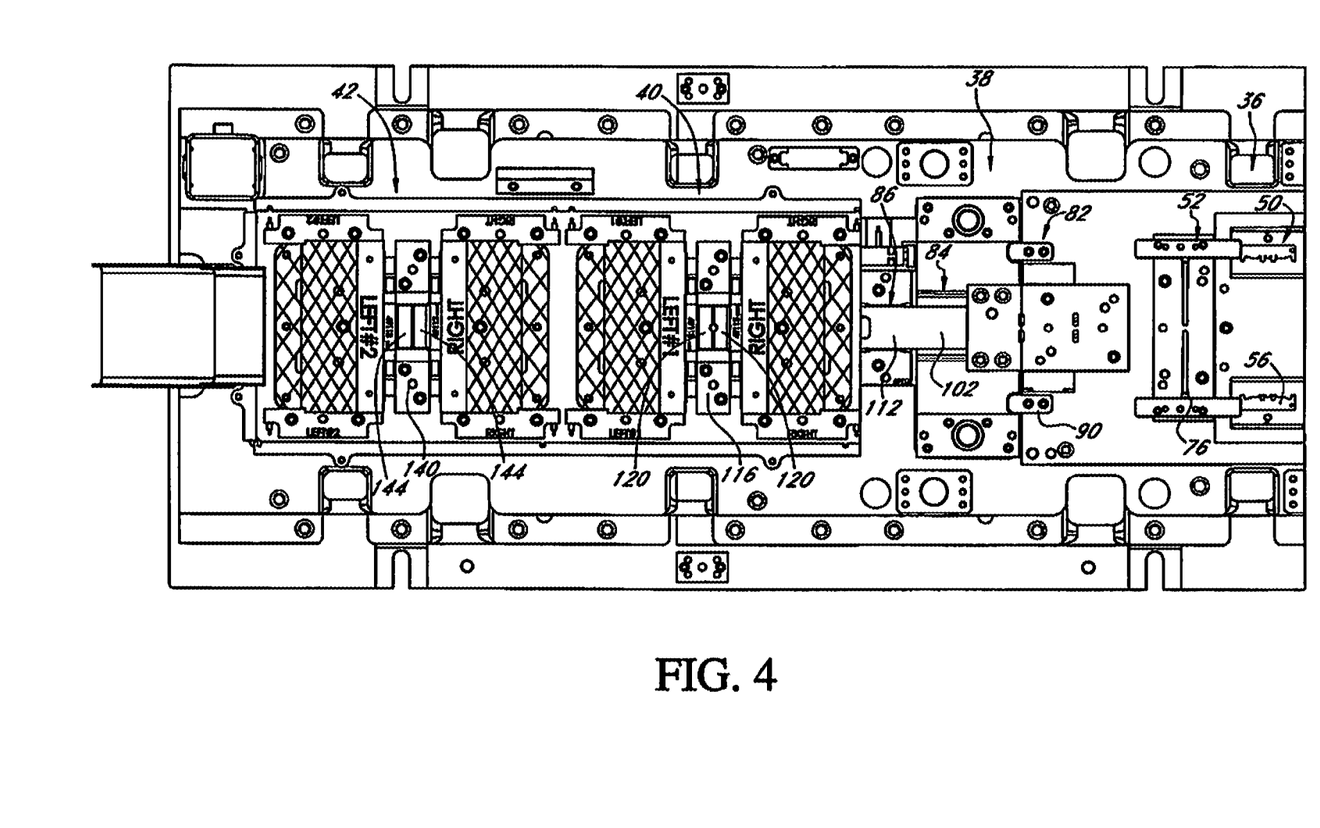
FIG. 4 is a plan view of a lower portion of a die assembly for use with the inventive process.

The trim station 36, shown in FIGS. 3 and 4, further comprises an end trim tool 50, and a blanking tool 52. The end trim tool 50 comprises an end trim punch 54 (FIG. 3) and a complimentary punch support 56 (FIG. 4) which are used to trim excess material from a first 58 and second edge 60 of a metal strip 44 (FIG. 7). This creates a first and second end 59, 61 on the eventual work piece 62. The end trim punch 54 and complimentary punch support 56 (FIGS. 3 and 4) are shaped to create at least one tab 64 located on the first and/or second ends 59, 61 of the work piece 62, and may also include the shapes necessary to create interlocking features 66, such as puzzle locks. The tabs 64 created by the end trim punch 54 are ideally sized to represent and fill in roughly one half of the prior art's V' shaped material gap 68, (FIG. 1) which is formed when a prior art annular form with a discontinuity is flanged. It is preferred that tabs 64, (FIGS. 7-13) are shaped to be roughly triangular and extend away from the first and second ends 58, 60 of the metal strip 44 beginning at an initiation point 70 corresponding to the initiation of the flange's radius 72 (FIGS. 12 and 13).

The trim station further comprises a blanking tool 52, including a blanking punch 74 (FIG. 3), and a complimentary blanking support 76 (FIG. 4). The blanking tool 52, creates individual workpieces 62 (FIG. 7) by placing a spacing between the workpieces creating two sidewalls 78. The blanking tool 52 also preferably cuts a slight radius 80 into the sidewall 78 adjacent to the tabs 64 on the first and second ends 59, 61 of work piece.

Figure 8:
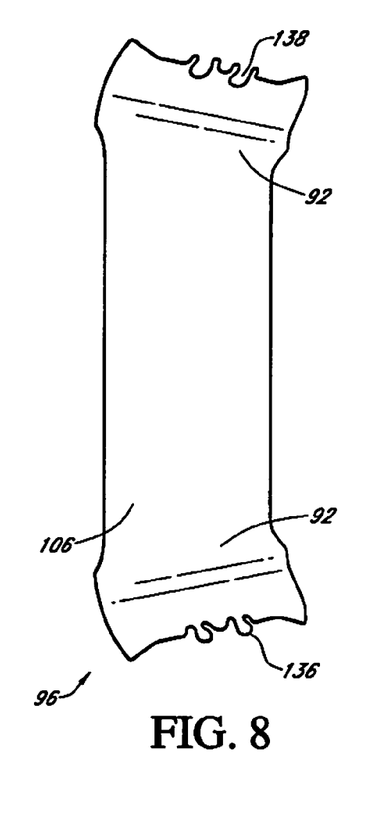
FIG. 8 is a perspective view of an exemplary workpiece formed by the initial formation station.

The annular formation station 38 preferably comprises three individual tools in the embodiment shown in FIGS. 3 and 4, including initial forming tool 82, intermediate formation tool 84 and an annular formation tool 86. The initial formation tool 82 comprises an upper formation die 88, and a lower formation support 90 which deforms the first and second ends of the workpiece 59, 61 (Shown in FIG. 7) in a downward direction and preferably imparts a radius 92 to both ends of the workpiece. The amount of the deflection is varied slightly from the first end 59 to the second end 61 so that when the annular form is created, tab 64 overlaps the annular form 94 (See FIGS. 10 and 11). An exemplary initially formed workpiece 96 is shown in FIG. 8.

Figure 9:
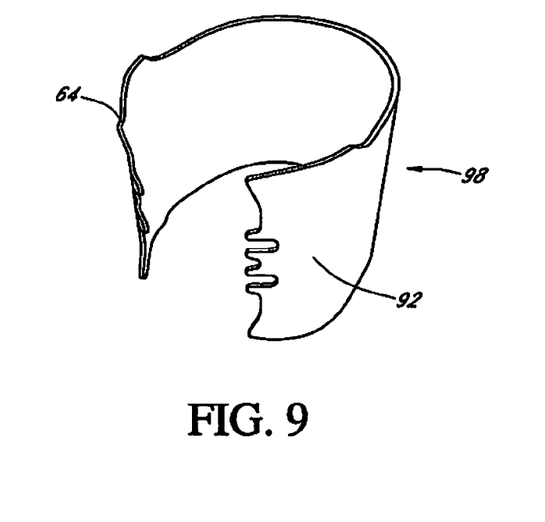
FIG. 9 is a perspective view of an exemplary workpiece formed by the intermediate formation station.

The intermediate formation tool 84 (FIGS. 3 and 4) forms the workpiece 62 into a substantially U-shaped form 98 (FIG. 11) by using an upper forming die 100 and a lower forming support 102 to deflect the workpiece about a mandrel 104. An exemplary intermediate formed workpiece 106 is shown in FIG. 9.

The annular formation tool 86 (FIGS. 3 and 4) performs the final shape of the annular form of the workpiece 62 and comprises an upper forming die 108, a mandrel 110, and a lower formation die 112 which brings the first and second ends 59, 61 of the workpiece 62 together, overlapping the tab 64 on the annular form 94. This creates an overlapped annular workpiece 114 as shown in FIGS. 10 and 11.

The flange formation station 40, shown in FIGS. 3 and 4, and detailed in FIG. 6, preferably comprises a lower support 116, an upper support 118, and at least one cam die 120, wherein the annular overlapped workpiece 114 is placed onto the lower support 116, secured by the upper support 118, and the cam die 120 is driven into the side 78 of the workpiece 62, imparting a flange 124 thereto. The flange is preferably formed to lie perpendicular to the annular form 94, and includes material from the overlapping tab 64, which is repositioned to lie co-planar with the flange 124, creating a fully flanged part 126, filling in the 'V' shaped discontinuity 68 shown in the prior art (FIG. 1), thereby providing adjacent material support 128 to the flange 124.

In the preferred form of the invention, radii 130 are placed into sides 78 the workpiece 62 (FIG. 7) by the blanking tool 52 (FIGS. 2 and 3). These radii 130 assist in the formation of the fully flanged part 126 (FIGS. 12 and 13) by allowing the tabs 64 to freely transition to their co-planar orientation in the flange 124 by allowing the tabs to freely transition across the annular form 94.

Figure 14:
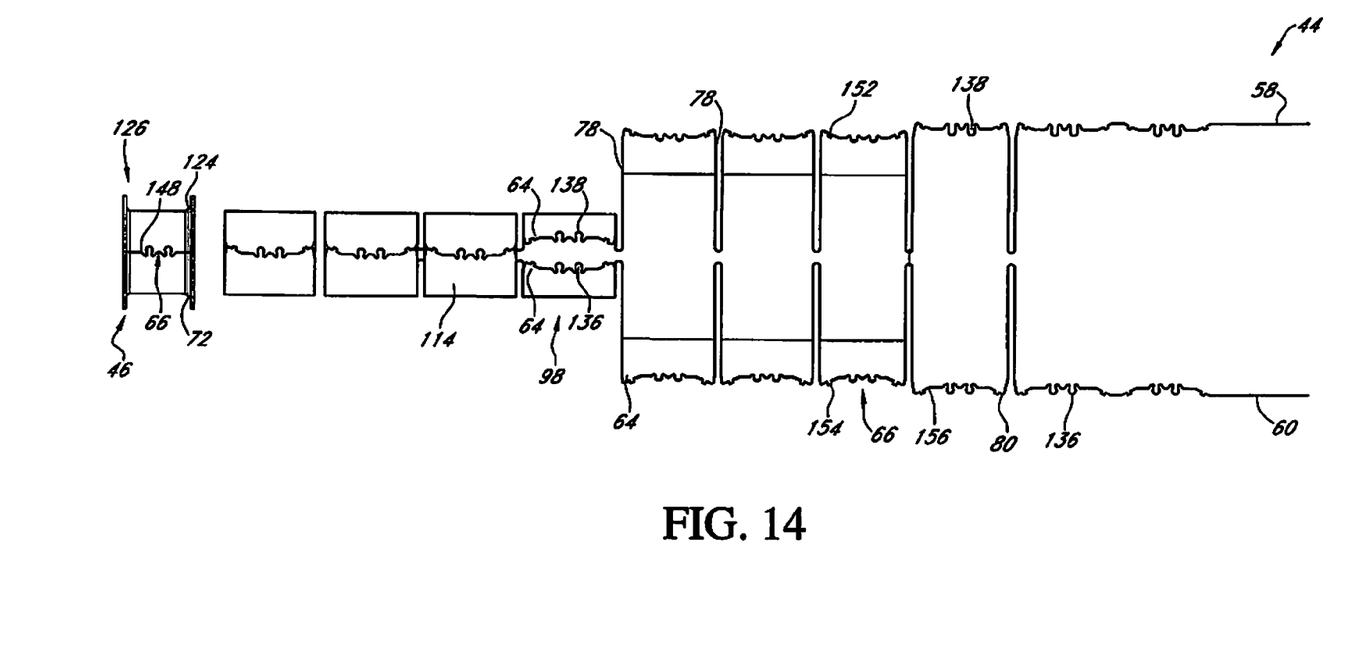
FIG. 14 is a plan view of a metal strip showing the progression of forming operations according to a second form of the invention.

Referring to FIGS. 10-13, an optional interlocking feature 132 may also be placed into the overlapped annular workpiece 114 by modifying the trim station 36 (FIGS. 3 and 4), and particularly the end trim tool 50, to impart a complimentary interlocking feature 132 into the first and second ends 59, 61 of the workpiece 62 (FIG. 14). The interlocking feature 132 assists in the retention of the annular form 94 by joining the first and second ends 59, 61 of the workpiece 114. In the preferred form of the invention, the interlocking feature 132 is an 'puzzle lock', which comprises a male projection 136 located on the first end 59 of the workpiece 62 and a complimentary female cutout 138 on the second opposite end 61. The interlocking features 132 are joined, preferably in the annular formation tool 86 of the formation station 38 shown in FIGS. 3 and 4, wherein the first and second ends 59, 61 of the workpiece 114 are interlocked by mechanically linking the male projection 136 with the female recess 138. Several exemplary puzzle lock designs are shown in FIGS. 8-11 of the U.S. Pat. No. 4,907,626, which issued to Mori on Mar. 13, 1990 and which is incorporated herein by reference.

An optional finish station 42 (FIGS. 3 and 4), comprises a fixed lower support 140, an upper support 142 and a cam die 144, similar to that used in first flange forming station 40 (FIG. 6). The finish and repack station 42 compresses the flange 124, locking features 132 and annular portion 94 of the workpiece (FIGS. 12 and 13) against the tool's cam die 144. This compresses the annular form reducing the radius of the annular portion of the workpiece 62, and increases the part's material thickness. This increase in thickness creates a tightly fitted seam between the first and second ends 59, 61 of the workpiece 62 and causes a slight expansion of the male projection 136 of the locking feature (if present) creating a tightly interlocked form.

The inventive process may be carried out in one form of the invention by feeding a metal strip 44 (FIG. 7) of uniform width and thickness into a first end 146 of the die assembly 30 (FIG. 2). The metal strip may be provided from a coil roll which contains a first and second edge 58, 60. As the metal strip 44 is advanced into the assembly 30, it encounters a trim station 36, which imparts a first and second end 59, 61 to the metal strip 44, by removing material from the first and second edge 58, 60, preferably creating at least one tab 64, and an interlocking feature 132. A blanking tool 52 then forms individual workpieces 62 from the metal strip 144, creating two side walls 78.

The workpiece 22 (FIG. 7) is then indexed into the annular forming station 38, wherein the tab 64 is deflected so that it they may readily overlap the workpiece 62 as first and second ends 59, 61 are brought proximate to one another. The ends 59, 61 of the workpiece 62 are then abutted, creating an overlapped annular workpiece 114. If the workpiece 62 contains optional interlocking features 132, these features are also joined as the first and second ends 59, 61 are abutted.

The overlapped annular workpiece 114 is then indexed to the flange formation station 40, wherein a flange 124 is formed on the side of the overlapped annular workpiece 114, the tab 64 is brought co-planar with the flange 124, and material from the tab 64 is used to fill in the 'V' shaped gap 68 (FIG. 1—Prior art) caused by the discontinuity 148 between the ends 59, 61 of the workpiece. Thus the tab 64, when repositioned, provides adjacent support to the first and second ends 59, 61 located in the flanged region 150 of the fully flanged part 126.

The fully flanged part 126 may optionally be indexed to a finish station 42 (FIGS. 3 and 4), wherein the workpiece's annular radius is reduced, increasing the material thickness of the part. This increase in material thickness creates a tightly fitted seam at the ends 59, 61 of the workpiece and causes a slight expansion of the interlocking feature 132 creating a tightly interlocked form.

In an alternate form of the inventive process stated above, the end trim tool 50 may be modified to create a notched cutout 152 in the tab 64 on the first end of the workpiece 59 (FIG. 13), while simultaneous placing a complimentary protrusion 154 on the second end 61 of the workpiece 62 (FIG. 14). In the preferred embodiment, the notched cutouts 152 and complimentary protrusions 154 are oriented to lie perpendicular to the peripheral edge 156 of the strip. The subsequent stations of the die assembly 30 (FIG. 1) are otherwise unmodified, and the flange forming station 40 (FIG. 6) interlocks the flange 124 by joining the notched cutout 152 with the complimentary protrusion 154.

The process and associated parts created by this process are considered that of the preferred embodiments only. Modifications of the invention will occur to those skilled in the art and those who make or use the invention. For instance, one skilled in the art would understand and appreciate that the process described could be performed in either a progressive or a transfer die system; with or without a carrier web. Hence, specific dimensions and other physical characteristics relating to the embodiments or tooling described shall not be considered limiting, unless expressly stated otherwise in the specification or the claims. Therefore, it is understood that the embodiments shown in the drawings and the examples set forth herein are described merely for illustrative purposes and not intended to limit the scope of the invention's claims as interpreted according to the principles of patent law, including the doctrine of equivalents.

The invention claimed is:

1. A flanged bushing comprising an cylindrical annular form (94) terminating in at least one end in a fully circular flange (124) extending from said cylindrical annular form at an angle, said cylindrical annular form (94) including a male projection (136) extending from one edge (66) of a seam and received in a female recess (138) formed in a complementary yet opposing edge of said seam, said flanged bushing made according to the method comprising the steps of:

providing a metal strip;

punching a work piece from said metal strip;

trimming said work piece, creating a first trimmed end containing a tab;

forming said work piece into an annular form by abutting a portion of said first trimmed edge with a second opposing end;

overlapping said tab with said annular form;

flanging said annular form creating a radial flange;

positioning said tab to lie co-planar with said radial flange;

trimming a protrusion into said tab and a complimentary notched cutout into said second opposing end; and causing said protrusion on said tab to interlock with said complimentary notched cutout on said second opposing end as said tab is positioned.

2. A fully flanged interlocked bushing comprising a cylindrical annular form (94) having a first and a second end and a longitudinal seam formed by two opposing edges of said cylindrical annular form; said cylindrical annular form (94) including a projection (136) extending from one edge (66) of the seam, and a recess complimentary to said projection formed in an edge complimentary to said one edge (66) and receiving said projection (136) therein for securely keeping said edges together; a radially extending and fully encircling flange (124) extending from at least one of said first and second end of said cylindrical annular form and extending away from said cylindrical annular form, said fully encircling flange including a seam formed by said two opposing edges of said cylindrical form interlocked together by a notched cutout (152) and complimentary protrusion (154), said fully flanged interlocked bushing made according to the method comprising the steps of:

providing a metal strip having a first and second exterior edge;

feeding said metal strip into a stamping assembly having a plurality of tool stations;

trimming material from said first exterior edge of said metal strip creating a first end comprising a first tab and a male interlocking feature;

trimming material from said second exterior edge of said metal strip creating a second opposing end comprising a second tab and a female interlocking feature;

blanking a work piece from said metal strip;

deforming said work piece into an initially formed work piece by imparting a first curvature into said first end of said work piece and imparting a second curvature to said second end of said work piece;

deforming said initially formed work piece into an annular interlocked work piece by abutting said first and said second ends causing said male interlocking feature to engage said female interlocking feature and causing said first tab to overlap said second tab;

flanging said annular interlocked work piece creating a radial flange;

positioning said first tab and said second tab to lie adjacent and co-planar to one another on said radial flange;

placing a notched cutout into said first tab;

placing a complimentary protrusion into said second tab; and causing said notched cutout on said first tab and said complimentary protrusion on said second tab to engage one another.

3. A continuously flanged interlocked bushing including a cylindrical annular body terminating in opposing first and second ends interconnected by a seam extending longitudinally along said cylindrical annular body and formed by complimentary opposing edges; a fully circularly-formed flange extending from at least one of said first and second ends of said cylindrical annular body; said seam extending longitudinally along said cylindrical annular body further including an interlock comprising a protrusion extending from one edge of said seam captured and retained within a recess formed in an opposite and complimentary edge of said seam; said continuously glanged interlocked bushing made according to the method comprising the steps of:

providing a metal strip having a uniform thickness and having a first and second exterior edge;

feeding said metal strip into a stamping assembly having a plurality of tool stations;

trimming material from said first exterior edge of said metal strip creating a first end comprising a first triangular shaped tab and a male puzzle locking member;

trimming material from said second exterior edge of said metal strip creating a second opposing end comprising a second triangular shaped tab and a female puzzle locking recess;

cutting a work piece from said metal strip and imparting a slight radial cutout into said first and second triangular shaped tabs adjacent to the said first and second ends;

deforming said work piece into an initially formed work piece by imparting a first curvature into said first end of said work piece, and imparting a slightly differing curvature to said second end of said work piece;

deforming said initially forming work piece over a mandrel forming a substantially U shaped form;

deforming said U shaped form into an annular interlocked work piece by abutting said first and said second ends, interlocking said male puzzle locking member with said female puzzle locking recess, and overlapping said first and said second triangular shaped tabs;

flanging said annular interlocked work piece creating a radial flange;

positioning said first tab and said second tab to lie adjacent and co-planar to one another on said radial flange;

restriking said annular interlocked work piece expanding said male puzzle locking member, and causing said first and said second tabs to abut one another on said radial flange;

placing a notched cutout into said first triangular shaped tab;

forming a complimentary protrusion into said second triangular shaped tab; and causing said notched cutout on said first triangular shaped tab and said complimentary protrusion on said second triangular shaped tab to engage one another.

\* \* \* \* \*